July 8, 1958     T. R. THOMSEN     2,842,672
COMPARATOR CIRCUIT USING PHOTO MULTIPLIER TUBES
Filed Feb. 8, 1955     2 Sheets-Sheet 1

INVENTOR.
THEODORE R. THOMSEN
BY
ATTORNEY

July 8, 1958     T. R. THOMSEN     2,842,672
COMPARATOR CIRCUIT USING PHOTO MULTIPLIER TUBES
Filed Feb. 8, 1955     2 Sheets-Sheet 2
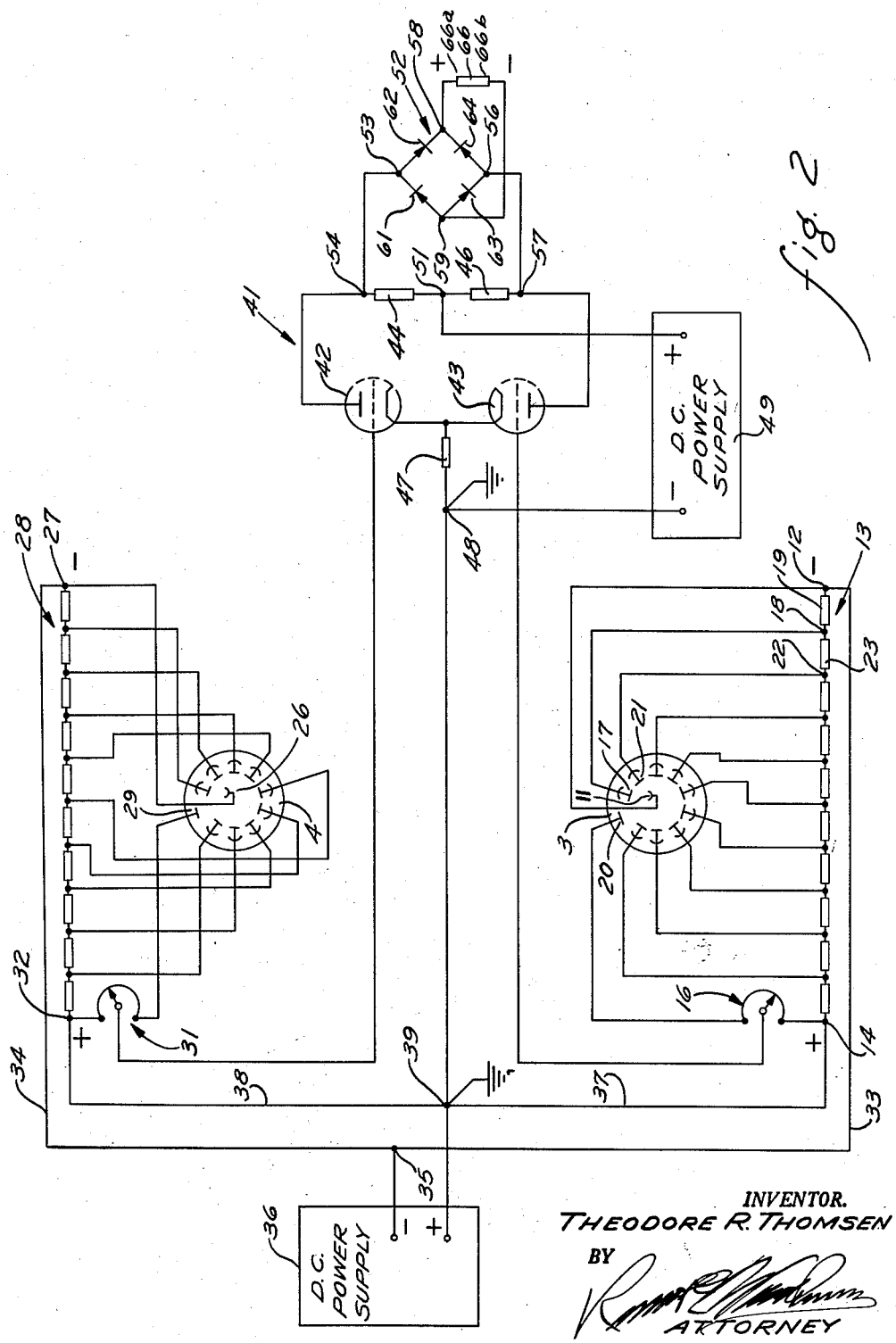
Fig. 2
INVENTOR.
THEODORE R. THOMSEN
BY
ATTORNEY

United States Patent Office 2,842,672
Patented July 8, 1958

2,842,672

COMPARATOR CIRCUIT USING PHOTO MULTIPLIER TUBES

Theodore R. Thomsen, Farmington, Mich., assignor to Robotron Corporation, Detroit, Mich., a corporation of Michigan Application February 8, 1955, Serial No. 486,791

3 Claims. (Cl. 250—83.3)

This invention relates to a comparator circuit and particularly to a comparator circuit utilizing photo multiplier tubes.

There are a wide variety of applications, such as in inspection devices of the type illustrated in the application of Stuart C. Rockafellow, Serial No. 519,160 filed January 30, 1955, wherein it is desirable to compare the intensity of illumination emanating from two or more sources. A large number of circuits have been proposed for this purpose, but all of them, insofar as I am aware, are subject to various objections. Particularly, the use of photo multiplier tubes introduces problems which have not yet within my knowledge been solved, such as the problem of equalizing the power supply to the respective tubes in order to compensate effectively for fluctuations in supply voltage and to compensate for variations in the characteristics of the several tubes which are commercially available. While a large number of attempts have been made in this direction, insofar as I am aware, they have all been either undesirably complicated or of insufficient reliability.

Accordingly, a principal object of the invention has been to provide a circuit for comparing the intensity of illumination emanating from at least two sources and utilizing photo multiplier tubes.

A further object of the invention has been to provide a circuit, as aforesaid, wherein fluctuations in supply voltage will not detrimentally affect the comparator function thereof.

A further object of the invention has been to provide a circuit, as aforesaid, including means by which the device can be initially adjusted for the characteristics of the particular tubes which may be used in a given situation and which will thereafter require no further adjustment.

A further object of the invention is to provide a circuit, as aforesaid, which will give a signal pulse of a single polarity upon the occurrence of an unbalance in the illumination emanating from said sources regardless of which light sensitive tube is at a given instant receiving the greater amount of light.

A further object of the invention is to provide a circuit, as aforesaid, which will be simple and which can be formed from simple and sturdy parts.

A further object of the invention is to provide a circuit, as aforesaid, which will be adaptable to a wide range of specific uses.

Other objects and purposes of the invention will be apparent to persons acquainted with apparatus of this general type upon an inspection of the accompanying drawings and reading of the following disclosure.

In the drawings:

Figure 2 is a diagrammatic illustration of one circuit embodying the invention.

In general, my invention comprises supplying power to a pair of photo multiplier tubes from a single source whereby fluctuations in the voltage of said source will affect said tubes equally and will not destroy the balance existing between them so long as illumination falling upon said tubes remains equal. The invention further consists in a circuit energized by said tubes which will amplify the output of said tubes in a bridge-type circuit, with the output of said bridge-type circuit being supplied, if desired, to a rectifier circuit which in turn actuates either a signal directly or any suitable form of trigger circuit.

Figure 1:
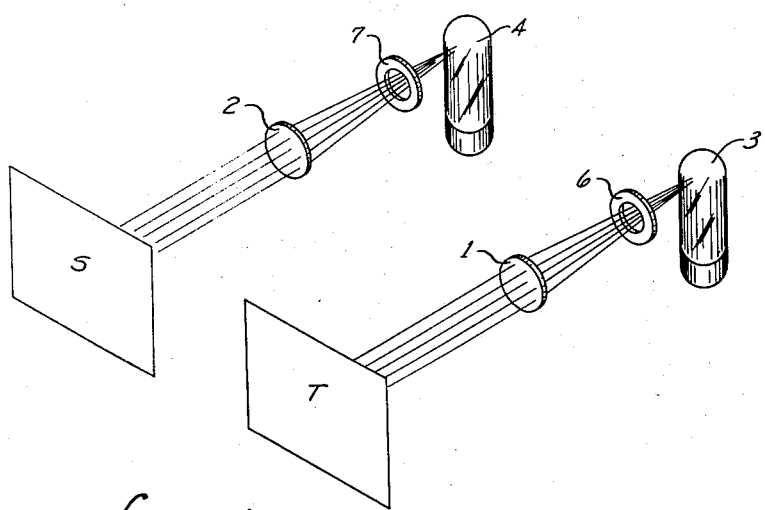
Figure 1 is an illustration of one type of use for a circuit of the invention.

Turning now to Figure 1 there is shown a standard item "S" and a test item "T" which are to be compared for some characteristic measurable by the intensity of illumination emanating therefrom. Said illumination may be either reflective and originating from some point in front of said objects, it may be transmissive in character and originating from some point behind said objects or the object themselves may be the source of the illumination. Said illumination is conducted through a suitable optical system, here illustrated schematically by the lenses 1 and 2, for focusing the respective light beams onto the proper part of photocells 3 and 4. Said photocells are of the photo multiplier tube type and, by way of example, may be that manufactured and sold by Radio Corporation of America as type 6328.

A pair of light intensity control devices 6 and 7 are interposed between the lenses 1 and 2 and the tubes 3 and 4. These may be of the iris diaphragm type or they may each utilize a pair of mutually rotatable polarizing gratings. These light intensity control devices are usually required to compensate for the variations in tube characteristics, particularly inasmuch as tubes of even the same origin and type will not be of identical characteristics. However, the nature of the circuit is such that with the light intensity control devices once adjusted for a particular pair of tubes, further adjustment will be unnecessary so long as said tubes do not materially vary from the characteristics with respect to which said adjustment was made. However, as said tubes become older, their characteristics may change and further adjustment of the light intensity control devices may then be required.

Referring now to Figure 2, there is shown a circuit embodying one portion of the invention. Here the tube 3 is shown having its cathode 11 connected to one end 12 of a resistor series 13, said resistors being connected in series with respect to each other and each being of equal resistance with respect to each other. The other end 14 of said resistor series 13 is connected through the resistance of a rheostat 16 to the anode 20 of the photo tube 3. The several dynodes of the photo tube, of which one is indicated at 17, are connected between successive ones of the resistors 13 so that the potential between each of them will be an equal amount, measured by the voltage drop across each of the respective resistances. Thus, dynode 17 is connected at 18 so that the potential between it and the cathode 11 is determined by the potential drop across the resistor 19. The dynode 21 is connected at 22 so that the potential existing between the dynode 21 and the dynode 17 will be determined by the potential drop across the resistance 23. The same arrangement exists for all of the remaining dynodes of the tube 3.

The tube 4 is similarly connected so that its cathode 26 is connected to a point 27 at one end of a resistor series 28 and its anode 29 is connected through the resistance element of a rheostat 31 to the other end 32 of said termined by the magnitude of the resistance 86. Each of the other dynodes in each of the tubes is similarly connected to each other and to common points between the successive resistances of the resistor series 72.

The amplifier tubes 42 and 43, as before, have their cathodes connected directly together and said cathodes are connected through a resistance 47 to the terminal 73. The grid of the vacuum tube 42 is connected to a junction point 87, located between the resistance 76 and the anode of the tube 4. The control electrode of the tube 43 is connected to the junction point 88 located between the resistance 74 and the anode of the tube 3.

Figure 3:
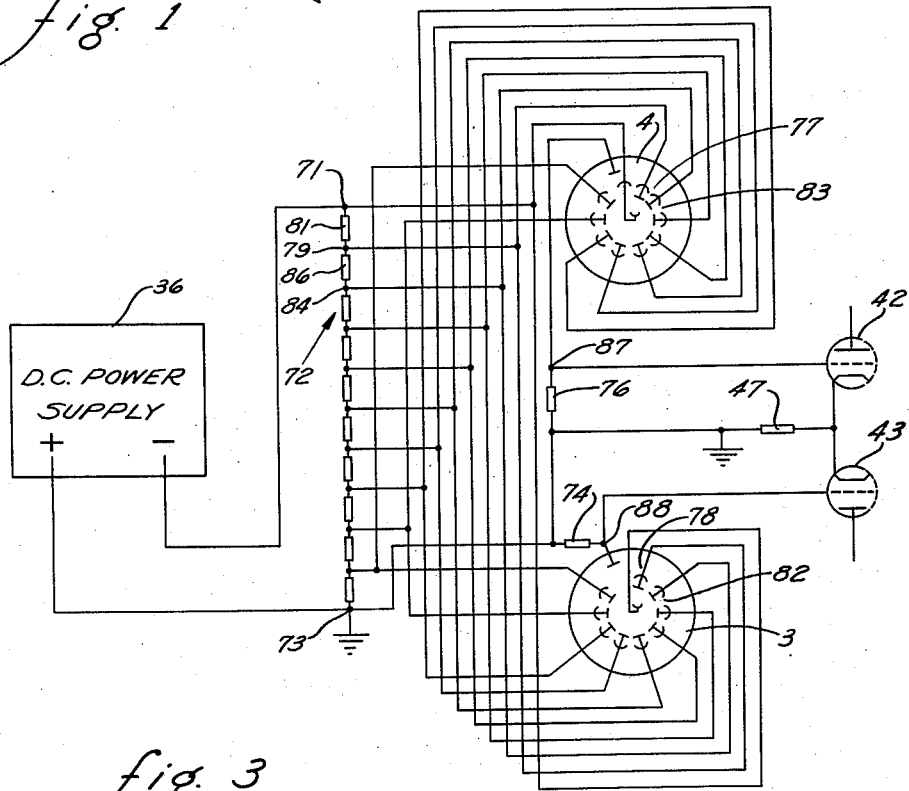
Figure 3 is a diagrammatic illustration of another circuit embodying the invention.

The operation of the invention shown in Figure 3 is substantially similar to the operation of the invention shown in Figure 2. Constant potential supplied by the source 36 is applied to the terminal 73 thence to the anodes of the tubes 3 and 4 through the resistances 74 and 76, respectively. Negative potential from said source is applied to the terminal 71 and is thence conducted directly to both of the cathodes of the tubes 3 and 4. The several dynodes are energized at potentials proceeding progressively from that of the anode of each of said tubes to that of the cathode of each of said tubes and any change in the potential supplied by said source that will affect each of said tubes equally. The output of their respective anodes is supplied to the grids of each of the amplifier tubes 42 and 43 and affects the conductivity of each thereof in a manner and for the purposes substantially similar to that set forth in connection with Figure 2.

While I have utilized specific examples of the invention for illustrative purposes, it will be apparent that numerous variations may be made in the specific apparatus employed and that the invention is applicable in a wide variety of particular situations. Further, while I have utilized inspection equipment to illustrate a typical use for the circuit, other uses will be apparent. Accordingly, it will be understood that many variations both in the use to which the apparatus is put and in the specific items of apparatus employed may be made without departing from the scope of the invention and the hereinafter appended claims are to include such variations excepting as they by their own terms require otherwise.

I claim:

1. An electro-optical system, comprising in combination: a pair of light-sensitive electron multiplier tubes, each tube having an anode, a cathode, and a plurality of dynodes, each tube having equal numbers of dynodes; a first source of unidirectional potential having negative and positive terminals, conductors connecting the cathode and anode of each of said tubes directly to the negative and positive source terminals, respectively; a voltage dividing network having its negative end connected to said negative terminal and its positive end connected to said positive terminal, for supplying progressively higher energizing voltages to said dynodes with respect to said cathode; a pair of vacuum tubes, conductors connecting the control electrodes of said vacuum tubes in the anode circuit of said multiplier tubes; a second source of unidirectional potential having positive and negative terminals; conductors connecting the cathodes of said vacuum tubes to the negative terminal of said second unidirectional potential source; a comparison circuit connected to the anodes of said vacuum tubes and to the positive terminal of said last-mentioned potential source.

2. The system defined in claim 1 wherein said comparison circuit includes a rectifier bridge circuit and conductors connecting the input terminals of said rectifier bridge circuit to the anodes of said vacuum tubes, and means connecting the output terminals of said rectifier bridge circuit to a load.

3. The system defined in claim 1 wherein said comparison circuit includes a conductor connecting the anodes of said vacuum tubes, a pair of resistances in said last-mentioned conductor, the positive terminal of said second potential source being connected to said last-mentioned conductor between said resistances, a bridge circuit and conductors connecting the respective input terminals of said bridge circuit to said anode-connecting conductor between the respective anodes and the adjacent resistance, and means connecting the output terminal of said bridge circuit to a load.

References Cited in the file of this patent

UNITED STATES PATENTS

| | | |
|---|---|---|
| 2,463,119 | Pyle et al. | Mar. 1, 1949 |
| 2,565,265 | Peterson | Aug. 21, 1951 |
| 2,583,143 | Glick | Jan. 22, 1952 |
| 2,593,206 | Short | Apr. 15, 1952 |